(No Model.)
D. SHELTON.
DEVICE FOR SECURING WHEEL TIRES.
No. 289,719. Patented Dec. 4, 1883.
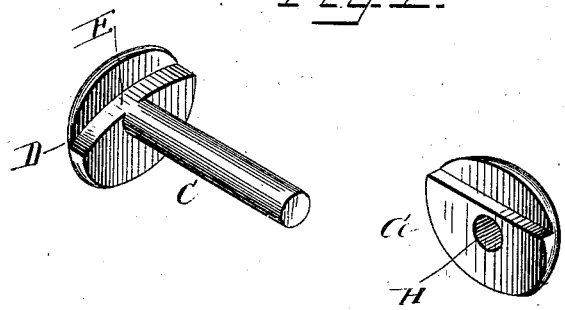
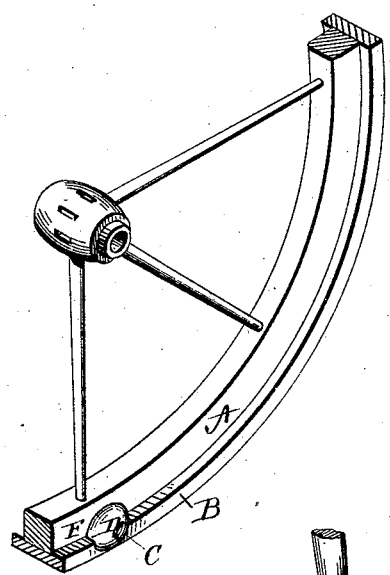
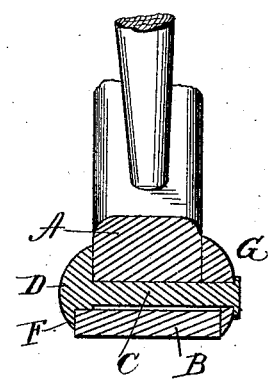
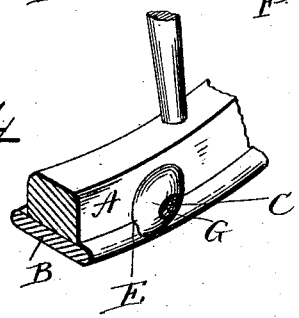
WITNESSES
INVENTOR.
Dyas Shelton,
by Andrew & Co.
Attorneys.

UNITED STATES PATENT OFFICE.

DYAS SHELTON, OF SANTA ROSA, CALIFORNIA.

DEVICE FOR SECURING WHEEL-TIRES.

SPECIFICATION forming part of Letters Patent No. 289,719, dated December 4, 1883.

Application filed May 29, 1883. (No model.)

*To all whom it may concern:*

Be it known that I, DYAS SHELTON, a citizen of the United States, residing at Santa Rosa, in the county of Sonoma and State of California, have invented a new and useful Rivet for Overset Tires of Vehicle-Wheels, of which the following is a specification, reference being had to the accompanying drawings.

This invention relates to rivets for that class of tires for vehicle-wheels which are known as "overset" tires; and it consists in certain improvements in the construction of the same, which will be hereinafter fully described, and particularly pointed out in the claims.

In the drawings hereto annexed, Figure 1 is a perspective view of my improved rivet and cap for the same. Fig. 2 is a perspective view, showing the application of the same. Fig. 3 is a transverse vertical sectional view, and Figure 4 is a perspective view, showing a modification.

The same letters refer to the same parts in all the figures.

Overset tires, or tires the edges of which project or extend over or beyond the rims of the fellies, are for many reasons desirable, in that they prevent the paint from wearing off the fellies, whereby they are made liable to become soaked with water and rot, and also in that they furnish broad tread and furnish a better general protection for the wheels. Heretofore these overset-tires have been secured in position by means of ordinary bolts and rivets; but this has not always been satisfactory, because after short use the tires would become loose and slip. To overcome this objection is the object of my invention.

In the drawings, A represents a section of the rim of a vehicle-wheel, and B the overset tire. The rivet which passes transversely through the felly consists of the shank C, and head D, the upper edge of which is curved, as at E, so as to conform to the outline of the tire. A short distance below the upper edge the head is provided, on its inner side, with a recess or shoulder, F, to receive the overset portion of the tire.

G is the rivet-cap, which is constructed like the head, and provided with a central opening or perforation, H, to receive the shank C, which is clinched over the cap in the usual manner.

The operation and advantages of this invention are obvious.

The modification shown in Fig. 4 consists simply in making the shoulder F curved, so as to adapt it to tires having rounded rims. In the remaining views it is made square.

I claim as my invention and desire to secure by Letters Patent of the United States—

1. The herein-described rivets for overset tires, having heads and caps, the upper edges of which are curved, so as to conform to the outline of the tires, and provided on their inner sides with recesses or shoulders adapted to receive and support the overset portions of the tire, substantially as set forth.

2. The combination of a vehicle wheel, the overset tire, and the transverse rivets having heads and caps provided with recesses or shoulders adapted to receive and support the overset portion of the tire, as set forth.

In testimony that I claim the foregoing as my own I have hereto affixed my signature in presence of two witnesses.

DYAS SHELTON.

Witnesses:
GEO. A. THORNTON,
JAMES ANDERSON.